May 28, 1940.  P. N. MILLER  2,202,113
MOTOR VEHICLE
Filed Nov. 12, 1936  4 Sheets-Sheet 1
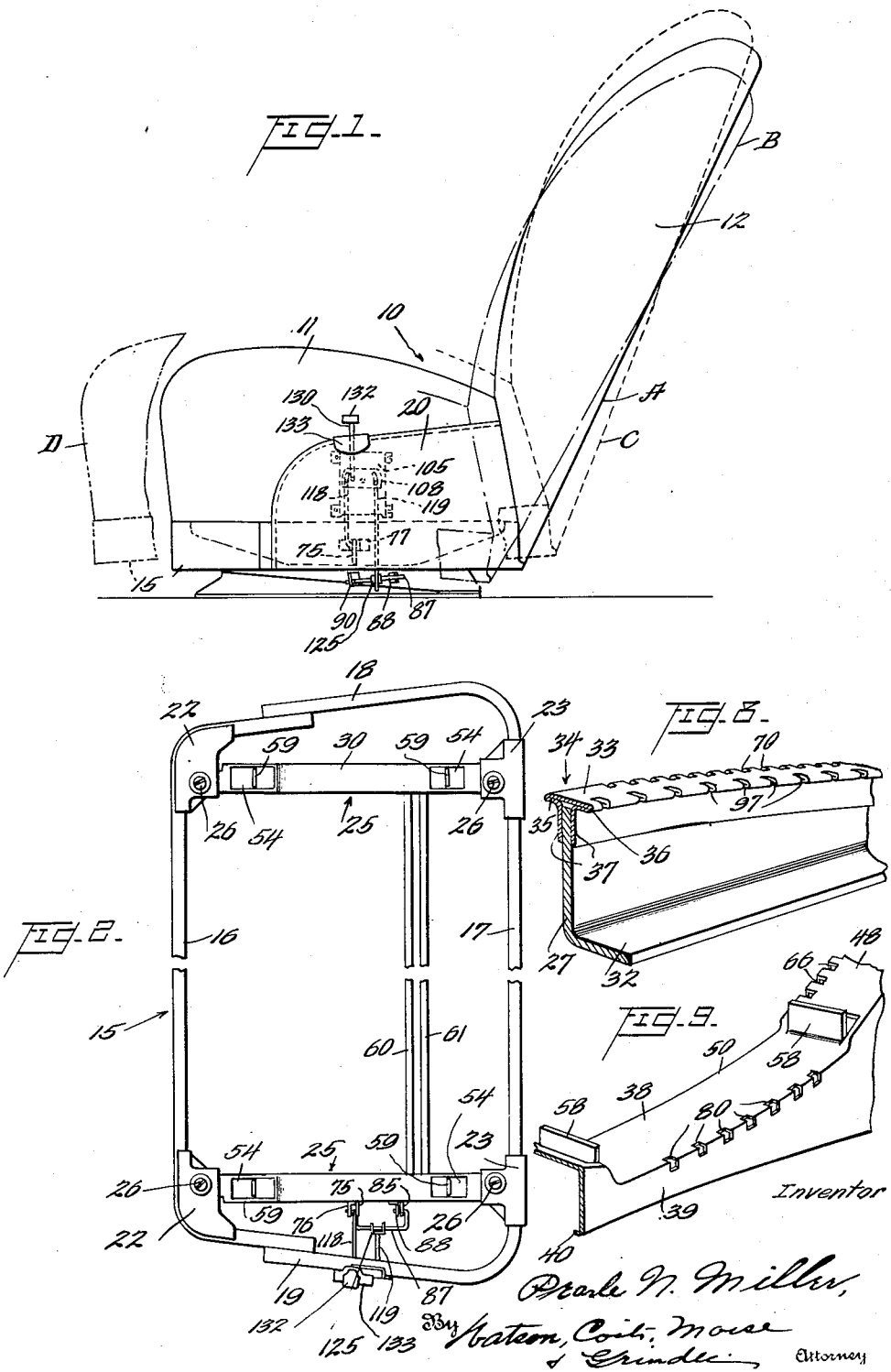

May 28, 1940. P. N. MILLER 2,202,113
MOTOR VEHICLE
Filed Nov. 12, 1936 4 Sheets-Sheet 2
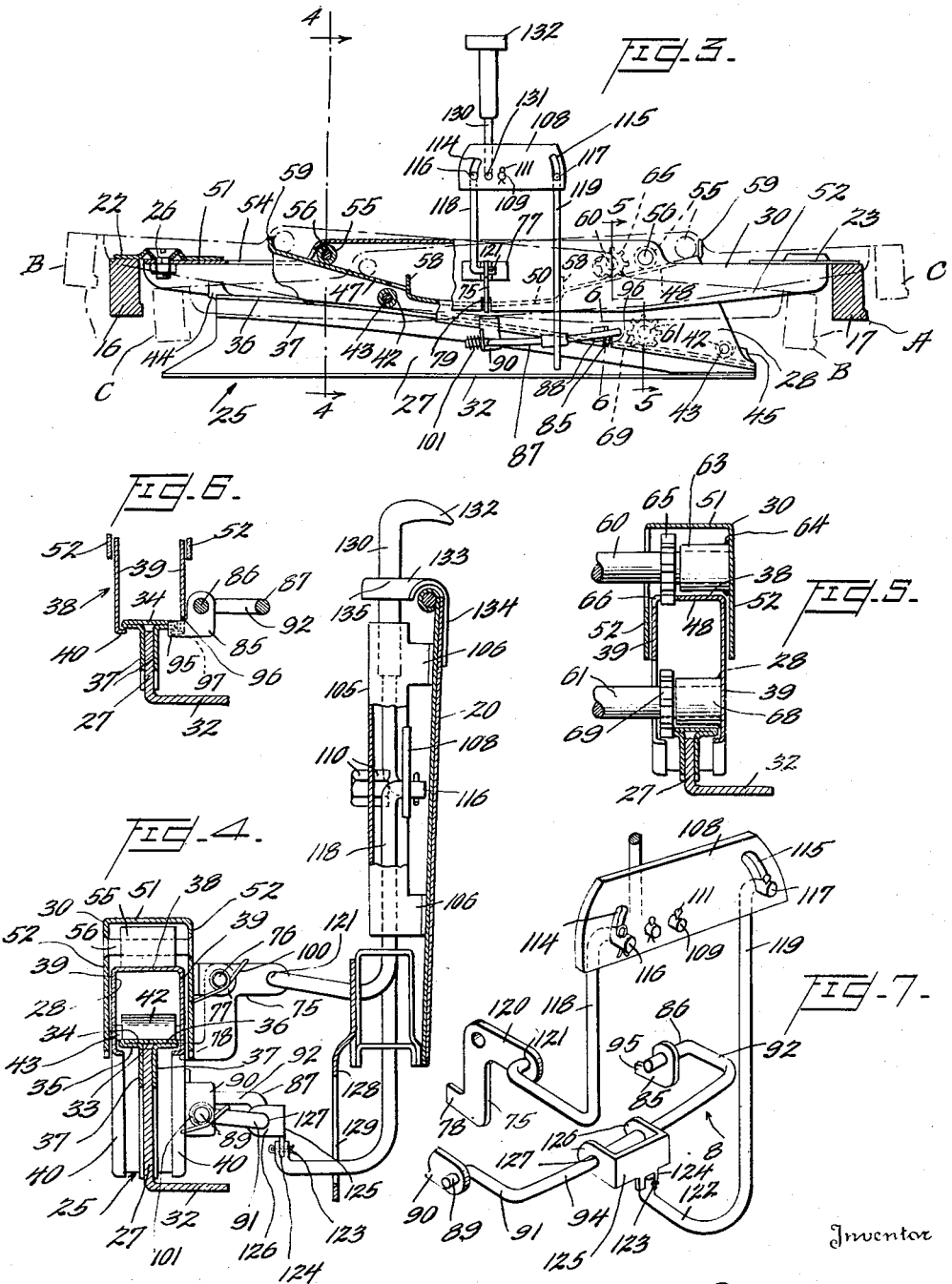

May 28, 1940. P. N. MILLER 2,202,113
MOTOR VEHICLE
Filed Nov. 12, 1936 4 Sheets-Sheet 3
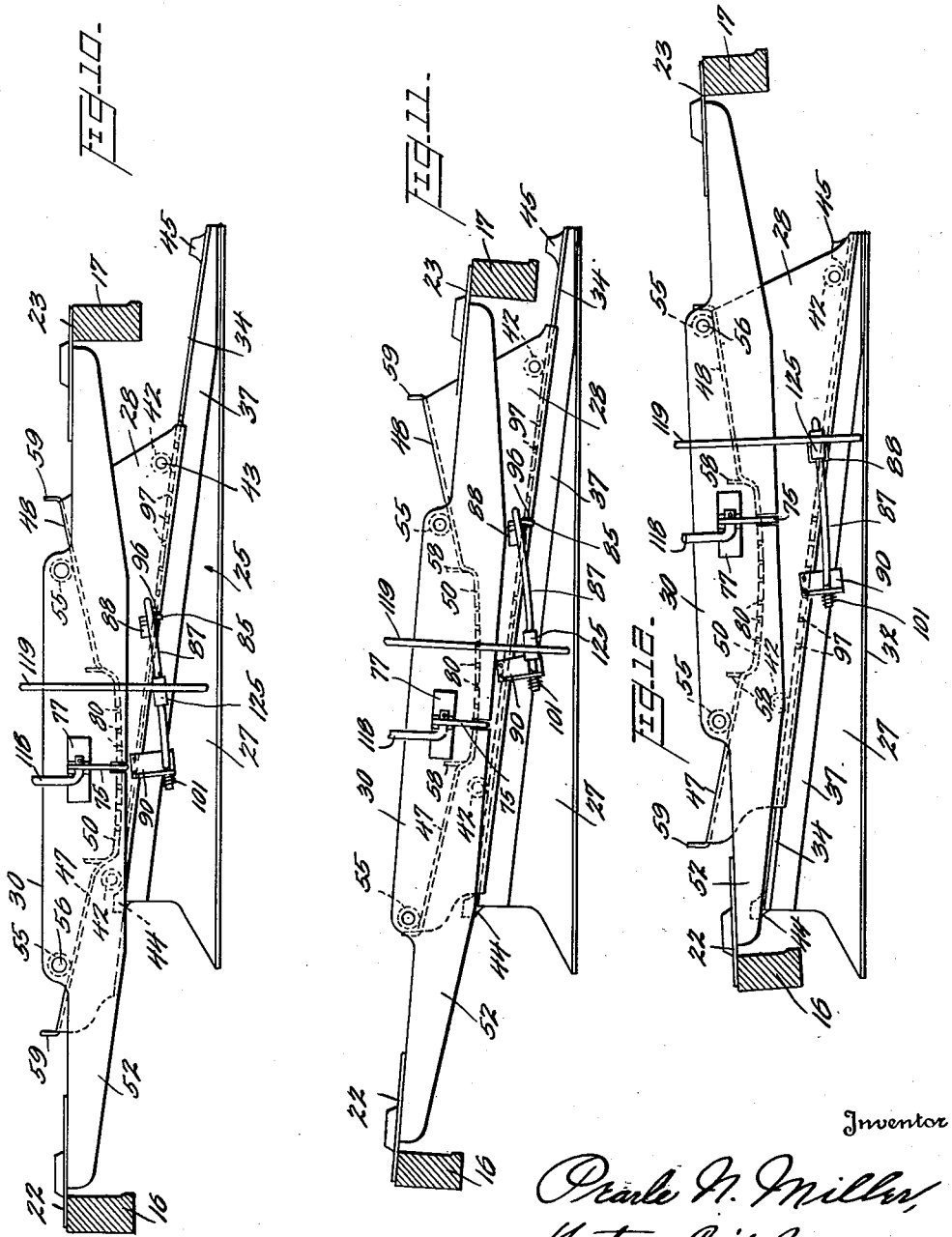
Inventor
Pearle N. Miller,
By Watson, Coit, Morse
& Grindle Attorney May 28, 1940.   P. N. MILLER   2,202,113
MOTOR VEHICLE
Filed Nov. 12, 1936    4 Sheets-Sheet 4
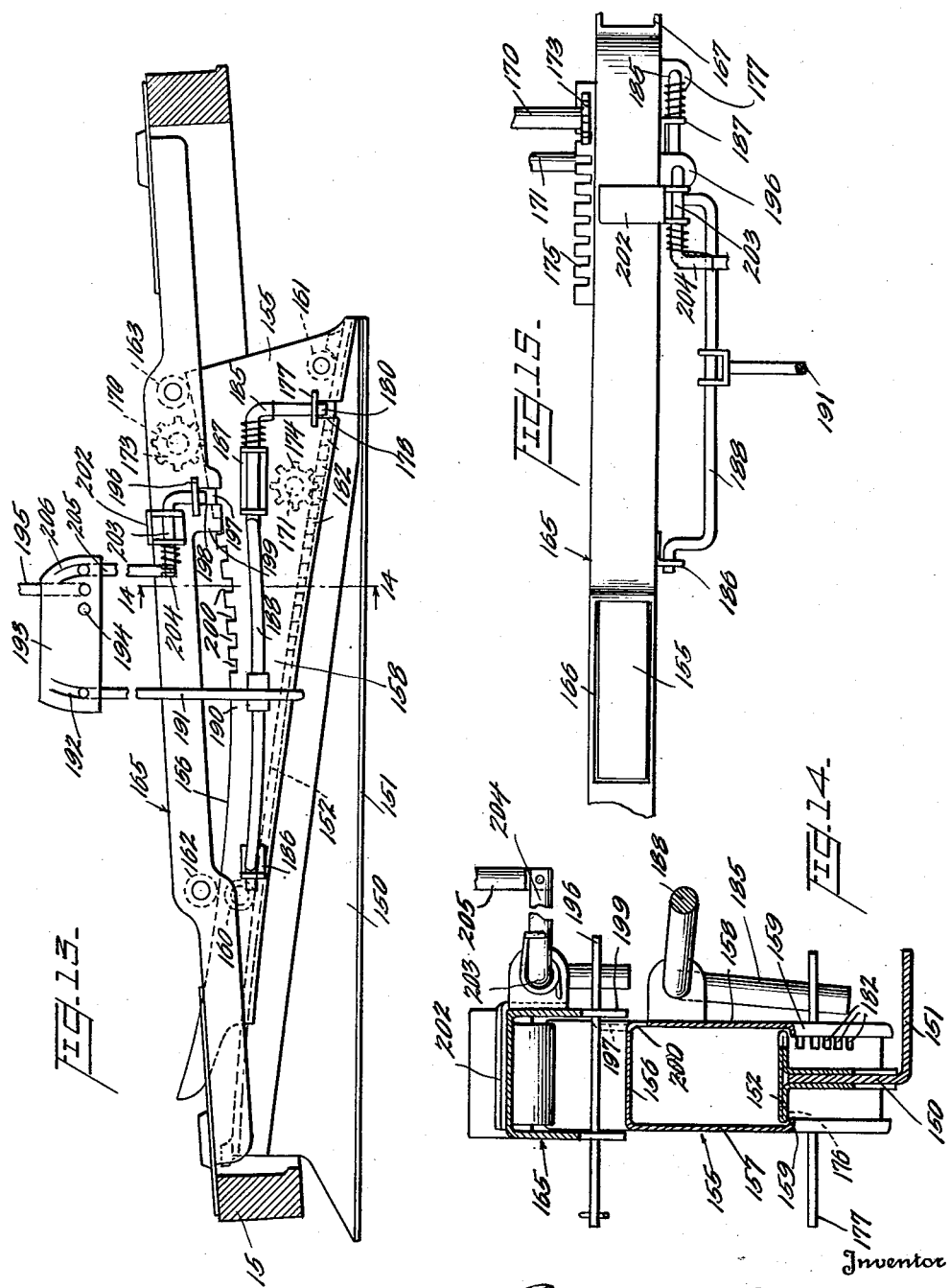
Inventor
Pearl N. Miller,
By Watson, Coit, Morse
& Grindle
Attorney Patented May 28, 1940

2,202,113

UNITED STATES PATENT OFFICE 2,202,113

MOTOR VEHICLE

Pearle N. Miller, Detroit, Mich., assignor to Packard Motor Car Company, Detroit, Mich., a corporation of Michigan Application November 12, 1936, Serial No. 110,529

10 Claims. (Cl. 155—14)

This invention relates to motor vehicles and more particularly to improvements in adjustable seats forming part of the body assembly of such vehicles.

The general object of the invention is to provide a vehicle seat which embodies, in its supporting structure, novel and improved mechanism for easily and quickly adjusting the seat in a great variety of positions to accommodate the requirements of different occupants or to satisfy the desire of a single user for changing or shifting his position during occupancy.

A more particular object of the invention is the provision of novel means for guiding the seat upon its support in rocking or tilting movements to and from a plurality of positions of adjustment.

Another object is to provide novel seat supporting means which is especially adapted for use in connection with the driver's seat of a motor vehicle, and by which provision is made for both forward and rearward adjustment and tilting or rocking adjustment of the seat.

A further object of the invention is to provide, in an adjustable seat of this type, novel locking means for retaining the seat in each of the described adjustments, and a common actuating means for selectively releasing the locking means to permit the separate adjustments to be effected.

In its preferred embodiments, the invention contemplates the provision of two longitudinally extending supporting frames, one disposed at either side of the seat. Each of these frames comprises a base member which rests upon the floor and is preferably secured thereto, an intermediate carriage member supported and guided upon the base member for forward and rearward movement, and an upper seat supporting carriage member adapted to rock or tilt with respect to the intermediate carriage member.

An important feature of the common actuating mechanism for the locking detents for holding the members of the supporting frames in adjusted positions, is the provision of certain flexible self-adjusting, operating connections which permit either one of the detents to be actuated without moving the other, and which also permit the attachment of the actuator to the seat itself by providing for relative shifting movement between the actuator and one of the detents, without disturbing the operativeness of the connection, during the adjustment involving the other detent.

Any suitable mechanism may be employed to move the seat mechanically to and from its positions of adjustment, if desired; but in the preferred embodiment the seat can be readily shifted by hand or by movement of the body of the operator, and the device is so illustrated and described herein.

Other objects and features of novelty will be apparent from the following specification when read in connection with the accompanying drawings in which certain embodiments of the invention have been illustrated by way of example.

In the drawings:

Figure 1 is a view in side elevation of a seat embodying the principles of my invention, certain of the adjusted positions of the seat being shown in broken lines;

Figure 2 is a plan view of the lower portion of the seat frame, the upholstery and the back of the seat being removed for the sake of clearness of disclosure of the operating mechanism;

Figure 3 is a view partly in side elevation and partly in vertical longitudinal section of one of the seat supports and the latching mechanism for retaining the seat in its various positions of adjustment; certain of these positions being indicated by broken lines;

Figure 4 is a vertical transverse sectional view of the seat support taken on line 4—4 of Figure 3 and showing the latch operating mechanism, for the most part in elevation;

Figure 5 is a vertical sectional view taken on line 5—5 of Figure 3;

Figure 6 is a fragmentary vertical sectional view on line 6—6 of Figure 3;

Figure 7 is a view in perspective of one form of locking mechanism for the seat adjustment;

Figures 8 and 9 are fragmentary perspective views of one of the base members of the seat supporting structure and of one of the shiftable carriages, respectively;

Figures 10, 11, and 12 are views in side elevation of the supporting structure at one side of the seat in various positions of adjustment;

Figure 13 is a view in side elevation of a seat support comprising an alternative embodiment of the invention;

Figure 14 is a vertical transverse sectional view taken on line 14—14 of Figure 13; and Figure 15 is a plan view of the supporting structure shown in Figure 13.

Although the seat forming the subject matter of the present invention is adaptable to various uses and may assume a variety of different forms, it is illustrated in the accompanying drawings as a motor vehicle seat, more particularly the front seat adapted for the use of the driver of the vehicle. The seat proper is designated generally by the reference numeral 10 and comprises the bottom 11 and back 12 both of which are suitably upholstered in accordance with the general practice. The back 12 is preferably though not necessarily formed rigidly with the bottom portion 11 of the seat. The framework of the seat bottom is indicated by the numeral 15 and comprises the forward frame element 16 and the generally parallel rearwardly disposed element 17, the ends of each of these elements being directed toward each other at the sides of the seat in order to form the side frame portions 18 and 19. At the two forward corners of the seat frame 16 there are provided brackets 22 which may be made of sheet metal and suitably secured to the forward frame member 16; and upon the rear frame member 17 in longitudinal alignment with the forward brackets 22 are disposed the brackets 23 which may also be of sheet metal and suitably secured to the member 17.

Outwardly disposed side members 20 which are rigid with the seat frame are provided in order to enclose the upholstered cushion portion of the seat bottom 11 and also to form a support for the actuating means employed in connection with the adjusting mechanism of the seat, as will be presently described.

In order to support the seat proper so that it may assume a variety of positions of adjustment so as to conform to the requirements of the occupant, there are provided the supporting frames 25 which are disposed in parallel relation so as to extend longitudinally of the seat, one at each side thereof. Opposite ends of the upper members of the supporting frames 25 are secured to the brackets 22 and 23 as by means of the screws 26.

Each of the supporting frames 25 preferably comprises three separate relatively movable members: a lower base member 27 which is adapted to rest upon the floor and preferably to be suitably secured thereto; and intermediate carriage member 28 adjustably carried by said base member; and an upper carriage member 30 which is secured to the seat frame and which, for most purposes, can be considered a part thereof, although it is preferably separately formed for ease in manufacture and assembly.

The base member 27 is preferably formed of a rigid sheet of metal disposed in a substantially vertical plane and provided with a horizontal flange 32 for contact with the floor. The upper edge of the member 27 is T-shaped in cross section so as to provide flanges forming a substantially flat upper bearing surface 33. The T-shaped head of the member 27 may be formed integrally therewith, or it may be provided as shown in the drawings by means of a separate inverted T-shaped member 34 having side flanges 35 and 36 and parallel webs 37 for embracing the member 27. The upper surface 33 of the base member 27 preferably slopes downwardly from the forward end of the member, and it may be either in the form of a straight inclined plane or upwardly convexed or arched as shown in the drawings.

The intermediate member 28 is also preferably formed of sheet metal, and of an inverted U-shape, having an upper substantially horizontal web 38 and side walls 39 each provided with an inturned lower edge 40 adapted to embrace the T-shaped head 34 of the base member 27, as more clearly shown in Figures 4 and 5 of the drawings. Within the intermediate member 28 there are provided the rollers 42 which are rotatably and, if desired, anti-frictionally supported by the axles 43 which extend from one of the side flanges 39 to the other. The rollers 42 are adapted to roll upon the upper surface 33 of the base member during adjustment of the intermediate member 28 with relation to the base member. At the forward and rearward ends of the track 33 thus provided on the base member, there are formed the abutments or stops 44 and 45 against which the rollers are adapted to strike in order to limit the extent of forward and rearward adjustment of the intermediate member 28.

The upper web 38 of the intermediate member 28 is of a generally concave configuration and is divided into three main sections, the two end sections 47 and 48 providing oppositely inclined tracks for guiding the movements of the upper member 30, and the intermediate arcuate portion 50, which provides a convenient location for certain locking mechanism to be described.

The upper carriage member 30 which is secured to the seat frame is also of a generally inverted U-shaped configuration so as to provide the upper web 51 and the parallel depending side walls 52 adapted to embrace the intermediate member 28. The upper web 51 is cut away as at 54 at points spaced from each end of the member 30 so as to provide openings through which the ends of the member 28 may project all as clearly shown in Figures 3 and 10–12 inclusive of the drawings. The upper carriage member 30 is provided with a pair of rollers 55 carried by the axles 56 extending between the side walls 52 and these rollers are adapted to travel upon the inclined tracks 47 and 48 provided on the intermediate member 28. Portions of the upper web 38 of the member 28 are struck upwardly as at 58 to provide inner stop abutments for limiting the travel of the rollers 55, and the intermediate member 28 is also provided with abutments 59 formed at the extreme ends of the tracks 47 and 48 for limiting the movement of the rollers in the opposite directions.

It will thus be seen that there are provided means for supporting and guiding the seat 10 in two kinds of adjusting movement: one by the travel of the intermediate member 28 along the somewhat inclined longitudinally extending track on the base member; and the other movement being permitted by the rocking or tilting of the upper carriage frame 30 on the oppositely inclined tracks 47 and 48 of the intermediate member. The supporting members 25 as thus far described are duplicated upon each side of the seating arrangement, and in order that the described movements shall take place in equal degree upon each side of the seat, the cross rods 60 and 61 are provided.

The rod 60 is rotatably mounted in the bearing bosses 63 secured as at 64 to one of the walls 52 of the upper carriage member 30 and extending to a similar bearing arrangement on the corresponding member of the opposite supporting frame 25. Secured rigidly upon the opposite end portions of the shaft 60 adjacent the bearings 63 are the small pinions 65 which are adapted to mesh with the rack portion 66 formed by the perforations provided on one margin of the track 48 of the intermediate member 28.

In order to similarly ensure equal movement of the intermediate member 28 along the base member 27 of each side frame 25 the cross rod 61 extends between the opposite side frames and is rotatably carried in the bearings 68 secured to the wall 39 of the intermediate member 28 and is provided with the pinion 69 which meshes with the rack 70 comprising the indentations provided in the flange 35 of the track member 34 secured to the base member 27 as clearly shown in Figure 8 of the drawings.

In order to rigidly retain the seat in its adjusted positions whether attained by the relative movement of the seat carriage 30 on the intermediate member 28 or by the movement of the intermediate member 28 upon the base member 27, there are provided detents or latches which are adapted to lock these relatively movable members together in their various positions of adjustment.

In order to lock the upper carriage member 30 to the intermediate member 28, there is provided the latching dog or detent 75 which is pivotally mounted upon the pin 76 carried by the bracket 77 attached to one of the side walls 52 of the member 30. The nose 78 of the dog 75 is adapted to move through the notch or opening 79 in the side wall 53 and to selectively engage within one of the notches 80 which are cut in the edge of the central portion 50 of the upper web 38 of the intermediate member 28. It will be noted that the surface 50, and thus the line of notches 80, are of an arcuate configuration having a curvature substantially equal to that of the path of rocking or tilting movement of the seat 10 as it is guided by the rollers 55 along the tracks 47 and 48; and the dog 75 may enter any selected one of the notches 80 depending upon the desired tilted position of the seat 10.

For locking the intermediate member 28 to the base member 27 in selected positions of adjustment along the inclined or arched surface of the base member there is provided the locking dog 85 which is rigidly secured upon the rotating portion 86 of the bail-like, crank member designated generally by the numeral 87. The portion 86 of the member 87 is also journalled in the bracket 88 which is secured to the side wall 39 of the intermediate member 28. The opposite aligned end portion 89 of the member 87 is also journalled in a similar bracket 90 secured to the intermediate member. The member 87 also comprises the two crank portions 91 and 92 which are connected by the relatively elongated slide portion 94 which is connected to an operating means as will be pointed out hereinafter.

The nose 95 of the dog 85 is adapted to enter the notch 96 formed in the lower edge of the wall 39 of the intermediate member 28 as best shown in Figure 6 of the drawings, and also to enter a selected one of the series of notches 97 formed in the flange 36 of the T-head member 34 carried by the base member 27. It will be readily seen that by the mechanism described, the intermediate member 28 may be retained in any one of several positions of adjustment along its path of travel upon the base member 27.

In order to urge the locking dog 75 into operative engagement there is provided a spring 100 which surrounds the latch pivot pin 76, and has its ends in stressed engagement with the latch and with a portion of the carriage 30. Similarly, the dog 85 is urged into engaged position by means of the spring 101 which surrounds the portion 89 of the rock shaft 87 and has its ends in engagement with the crank portion 91 and a portion of the intermediate member 28 respectively.

In order to actuate the latch dogs 75 and 85 a common actuating means is provided which is illustrated to the best advantage in Figures 4 and 7 of the drawings. Upon the inner side of the frame portion 20 at one side of the seat there is provided the housing or bracket 105 which is provided with the flanged legs 106 for securing it to the member 20. A rocking lever or walking beam 108 is fulcrumed adjacent its center upon the pin 109 secured to the bracket 105 as by means of the nuts 110. A cotter pin 111 prevents the removal of the lever 108 from the fulcrumed pin. Adjacent the respective ends of the lever 108 there are provided the arcuate slots 114 and 115 which are centered upon the pin 109. Normally resting within the lower ends of the slots 114 and 115 are the horizontally bent ends 116 and 117 of the links 118 and 119 which provide the operative connections of the latches 75 and 78 with the tilting lever or beam 108. The link 118 is bent laterally and pivotally connected with the cranked end 120 of the latch 75 as at 121. The link 119 is also bent inwardly toward its latch 85 and is connected by means of a transverse horizontal pivot 123 with the projection 124 extending from the U-shaped sliding member 125 whose arms 126 are provided with openings 127 for the reception of the elongated portion 94 of the latch carrying crank member 87. A downwardly extending bracket 128 is secured to the side portions of the rear frame member 17 and is provided with the vertical slot 129 through which the horizontal portion 122 of the link 119 extends, and by which it is guided in its vertical movements.

A vertically extending operating rod 130 is pivotally secured to the lever 108 as at 131 and is provided at its uppermost end with the handle portion 132 adapted to be grasped by the fingers in actuating the latches. A guide member 133 is provided with a flange 134 secured to the side frame member 20 and a horizontal portion 135 which is provided with an opening through which the rod 130 extends.

It will now be seen that by pulling upwardly upon the actuating element 130, the lever 108 will be rocked about its pivot 109 in a clockwise direction as viewed in Figure 7 of the drawings. This will cause the link 118 to be pulled upwardly rotating the latch 75 so as to cause its nose 78 to be withdrawn from engagement with the notches 80 of the intermediate member, and will permit the seat carriage 30 to be rocked or tilted with relation to the intermediate member 28. During this movement the other link 119 will not be affected by the rocking of the lever 108 on account of the lost motion connection provided by the slot 115.

In order to release the latch 85 when it is desired to move the seat 10 forwardly or rearwardly upon the base member 27, the actuating handle 130 is moved downwardly thus rocking the lever 108 in a counterclockwise direction as viewed in Figure 7 and pulling upwardly upon the link 119. Due to the provision of the slot 114 the link 118 will be unaffected during this movement. Upward movement of the link 119 will cause the crank member 87 to swing upwardly and withdraw the latch 85 from engagement with the notches 97.

During the rocking or arcuate movement of the seat the sliding member 125 will move along the elongated portion 94 of the crank member 87 and will always be in position for actuating the latch 85 no matter what position of rocking or tilting adjustment the seat may occupy. Since the movement of the seat and consequently of the actuating assembly in the rocking movement is substantially arcuate, the slide portion 94 of the crank member 87 is preferably curved to substantially conform to this arcuate path of movement. The pivotal connection 123, 124 also may enable the linkage to adapt itself to any departure of the crank 87 from such curvature. Several of the positions of the various parts of this adaptable connection are shown in Figures 10, 11 and 12 of the drawings.

Several of the numerous positions of adjustment of which the device is capable are illustrated in the drawings. For example, in Figure 1 the position shown in solid lines and designated A shows the seat in the median positions of both adjustments. The position indicated in broken lines and designated B shows the seat still in the midposition of the forward and rearward adjustment but tilted or rocked in a clockwise direction around its center of rotation so that the back 12 of the seat is disposed at a greater inclination than in the normal position. The position indicated by broken lines and designated C in Figure 1 is one in which the seat is rotated in a counterclockwise direction so that the back 12 is less inclined than in the other positions. The forward edge of the seat is shown in broken lines at D in Figure 1 in the foremost position to which it can be adjusted forwardly and rearwardly on the base member 27 and also tilted downwardly by a rearward movement of the rollers of the upper carriage member on the inclined tracks of the intermediate member.

In Figure 3 of the drawings the three positions of tilting adjustment designated A, B, and C are the same as those indicated in Figure 1, but the parts of the seat support 25 are shown in the position they occupy after a rearward movement on the base member 27. Figure 10 illustrates the parts in the extreme forward position of longitudinal adjustment on the base member 27 and with the tilting adjustment at the intermediate or level position. Figure 11 shows the mechanism in the same extreme forward position but with the seat tilted rearwardly and the rollers of the carriage 30 in their forward positions on the tracks 47 and 48. Figure 12 shows the parts in the rearmost position of longitudinal movement upon the base member 27 and in the extreme forwardly tilted position wherein the rollers carried by the upper carriage member 30 are at their rearward limiting positions on the tracks 47 and 48. It will be understood that for each position of longitudinal adjustment the full range of tilting adjustment is possible and vice versa. Thus the possible number of different positions of the seat is the product of the number of tilting or rocking positions and the number of longitudinal positions.

The embodiment of the invention illustrated in Figures 13, 14, and 15 will now be described. The base member 150 in this embodiment is of the same or similar construction to that designated 27 in the earlier described embodiment, being provided with the lower flange 151 and the substantially T-shaped head member 152 applied to the upper edge of the base member 150. The intermediate member 155 is substantially U-shaped in cross section and is provided with the upper web 156 and the downwardly extending walls 157 and 158, the lower edges of which are bent inwardly as at 159 to embrace the flanges of the base member 150. The intermediate member 155 is provided with the rollers 160 and 161 which roll upon the track provided by the upper surface of the base member in just the same way as described in connection with the first embodiment. The upper web 156 of the intermediate member 155 is of an arcuate configuration to provide a smoothly curved track for the rollers 162 and 163 of the upper seat carriage member 165. The member 165 is provided with openings 166 and 167 through which the ends of the intermediate member may project during certain movements of adjustment. The top carriage member is suitably connected to the seat frame 15 as in the other embodiment. Cross rods 170 and 171 connect the seat frame carriages 165 and the intermediate carriages 155 respectively upon either side of the seat, and are provided with the pinions 173 and 174 which respectively mesh with the racks 175 and 176 in the intermediate member 155 and the base member 150.

For latching the intermediate member 155 and the base member 150 in adjusted positions, the sliding latch member 177 is provided, which passes through slots 178 formed in the side walls of the intermediate member. A depending tongue 180 is formed on the latch member and is adapted to enter a selected one of the notches 182 formed in a flange of the head portion of the base member 150. An actuating crank member 185 is pivotally mounted in the brackets 186 and 187 carried by the intermediate member 155 and is provided with the elongated cranked portion 188 upon which the sliding member 190 of the actuating mechanism is carried. The link 191 is pivotally connected with the slide 190 as in the former embodiment and is provided with an upper hooked end occupying the slot 192 formed in the rocking lever 193 which is pivoted at 194 and actuated by means of the handle 195.

The upper carriage member 165 is locked to the intermediate member 155 by means of the sliding detent 196 which is provided with the tongue 197 and reciprocates in the slot 198 formed in the depending portion 199 of the upper carriage member 165. The tongue 197 is adapted to selectively engage one of the notches 200 cut in the corner of the intermediate member 155 where the upper track surface 156 joins the side wall 158. A supporting bracket 202 is carried by the upper member 165 and serves to pivotally support the operating crank 203, the downturned end of which engages the sliding latch 196. An apposite outwardly turned end 204 of the crank member 203 is engaged by the link 205 which, by means of the slot 206 is provided with a lost motion connection with one end of the rocking lever 193.

On account of the different relative location of the two latch members in this embodiment the position of the connections with the actuating rocking lever 93 is reversed, but the directions of movement of the operating handle 195 for actuating the two latches are the same as in the previous embodiment, namely, a downward movement of the actuator to release the latch controlling the forward and rearward adjustment of the seat and an upward movement of the member 195 to operate the latch which controls the tilting or rocking movement.

It will, of course, be readily understood that the latter described embodiment is capable of a variety of adjustments just as has been described in connection with the earlier embodiment; the position of the parts shown in Figure 13 being one in which the longitudinal adjustment is at the extreme rearward position and in which the seat is also tilted forwardly as far as possible.

It will be understood that various changes and modifications can be made in the embodiments illustrated and described herein without departing from the scope of the invention as defined in the following claims. For example, so far as the broader aspects of the invention are concerned, the tilting adjustment could be provided between the base member and the intermediate member of the seat supporting frame, and the forward and rearward adjustment provided between the intermediate and the upper carriages.

Having thus described the invention, what is claimed as new and desired to be secured by Letters Patent is:

1. An adjustable seat of the class described comprising, in combination, a shiftable seat frame, a pair of longitudinally extending supporting frames one disposed beneath each side of said seat frame, each of said frames comprising a base member adapted to rest upon the floor, an intermediately disposed member supported upon said base member for substantially longitudinal adjustment along the latter, means for supporting said seat frame for rocking movement in an arcuate path upon said intermediate member, racks on each of said intermediate and base members, a cross shaft rotatably mounted in said seat frame and connecting opposite sides thereof, gears secured to the ends of said shaft and meshing with the racks on the intermediate members, a cross shaft rotatably mounted in and connecting the opposite intermediate members, and gears secured to the ends of said last named shafts and meshing with the racks on the base members, whereby uniform adjusting movement of each side of said seat is assured.

2. An adjustable seat of the class described comprising, in combination, a shiftable seat frame, a pair of longitudinally extending supporting frames one disposed beneath each side of said seat frame, each of said frames embodying means for adjusting said seat along different lines of movement for attaining a variety of positions of occupancy, said means comprising a base member adapted to rest upon the floor, an intermediately disposed member supported upon said base member for translational movement longitudinally of said base member to and from a plurality of positions of adjustment, means for supporting said seat frame for movement upon said intermediate member along an arcuate path to and from a plurality of positions of adjustment, the center of curvature of said arcuate path being above said seat, cross members operatively connecting the opposite sides of said seat frame and the opposite intermediate supporting members respectively for insuring uniform movement at each side of the seat, means for locking said seat frame to said intermediate members, and means for locking said intermediate members to said base members in their respective adjusted positions.

3. An adjustable seat of the class described comprising, in combination, a shiftable seat frame, a pair of longitudinally extending supporting frames one disposed beneath each side of said seat frame, each of said frames comprising a base member adapted to rest upon the floor, an intermediately disposed member adjustably supported upon said base member for translational movement therealong, means slidably supporting said seat frame for movement in an arcuate path to and from a plurality of positions of adjustment upon said intermediate member, means for locking said seat frame to said intermediate members, means for locking said intermediate members to said base members in their respective adjusted positions, and a common operating means for both of said locking means.

4. An adjustable seat of the class described comprising, in combination, a shiftable seat frame, a pair of longitudinally extending supporting frames one disposed beneath each side of said seat frame, each of said frames embodying means for adjusting said seat along different lines of movement for attaining a variety of positions of occupancy, said means comprising a base member adapted to rest upon the floor, an intermediately disposed member supported upon said base member for movement along one path to and from a plurality of positions of adjustment, means for supporting said seat frame for sliding and tilting movement to and from a plurality of positions of adjustment upon said intermediate member, means for insuring uniform movement at each side of the seat, said means comprising members extending across the seat and operatively connecting the opposite sides of said seat frame and the opposite intermediate supporting members respectively, an element carried by said seat frame for selective engagement with one of said intermediate members at any one of a plurality of points to lock them in adjusted positions with respect to each other, means carried by one of said intermediate members for selective engagement with one of said base members at any one of a plurality of points to lock said members in adjusted positions, and a common operating means for said locking means carried by a portion of said seat frame.

5. An adjustable seat of the class described comprising, in combination, a seat frame, and a supporting frame therefor, said supporting frame disposed longitudinally of the seat and including a base member adapted to rest upon the floor, an intermediate member carried by said base member and movable substantially longitudinally with respect thereto to and from a plurality of positions of adjustment, means for guiding said seat frame upon said intermediate member for movement in a vertical longitudinal plane to and from a plurality of positions of adjustment, means carried by said seat frame for engagement with said intermediate member to lock them in said positions of adjustment, means carried by said intermediate member for engagement with said base member to lock said members in their positions of relative adjustment, a common actuating means for both of said locking means carried by an element which is movable with said seat frame, an operative connection between said common actuating means and said first named locking means, and an operative connection between said actuating means and said second named locking means which embodies means for providing for relative movement between said actuating and locking means during said second named adjusting movement.

6. An adjustable seat of the class described comprising, in combination, a seat frame, a supporting frame therefor, said supporting frame disposed longitudinally of the seat and including a base member adapted to rest upon the floor, an intermediate member carried by said base member and movable substantially longitudinally with respect thereto to and from a plurality of positions of adjustment, means for guiding said seat frame upon said intermediate member for movement in a vertical longitudinal plane to and from a plurality of positions of adjustment, means carried by said seat frame for engagement with said intermediate member to lock them in said positions of adjustment, means carried by said intermediate member for engagement with said base member to lock said members in their positions of relative adjustment, a common actuating means for both of said locking means carried by a portion of said seat frame and comprising a lever pivoted intermediate its length and manually operated means for rocking said lever, and operative connections between the ends of said lever and said locking means respectively.

7. An adjustable seat of the class described comprising, in combination, a seat frame, a supporting frame therefor, said supporting frame disposed longitudinally of the seat and including a base member adapted to rest upon the floor, an intermediate member carried by said base member and movable substantially longitudinally with respect thereto to and from a plurality of positions of adjustment, means for guiding said seat frame upon said intermediate member for movement in a vertical longitudinal plane to and from a plurality of positions of adjustment, a spring pressed latch pivotally mounted on said seat frame for engagement with said intermediate member to lock them in said positions of adjustment, a spring pressed latch pivotally mounted on said intermediate member for engagement with said base member to lock said members in their positions of relative adjustment, a common actuating means for both of said locking means carried by a portion of said seat frame and comprising a lever pivoted intermediate its length and manually operated means for rocking said lever, linkage having a lost motion connection with one end of said lever for operatively connecting said actuating means with said first named latch, linkage having a lost motion connection with the other end of said lever for operatively connecting said actuating means with said second named latch, whereby selective and independent actuation of said latches by rotation of said lever in opposite directions is assured, and a sliding connection between said last named linkage and its associated latch to permit relative movement therebetween during adjustment of the seat frame relatively to said intermediate frame.

8. An adjustable seat support comprising, in combination, a base member adapted to rest upon the floor, an intermediate member supported upon said base member for substantially longitudinal forward and rearward movements to and from a plurality of positions of adjustment, an upper carriage member adapted to be secured to the seat and mounted upon said intermediate member for tilting and adjusting movements with respect thereto, an arcuate track provided on said intermediate member, the center of curvature of which is above said seat support, rollers on said upper carriage member adapted to support said member upon said track during said tilting movement, and means for locking the members of said seat support in their various positions of adjustment.

9. An adjustable seat support comprising, in combination, a base member adapted to rest upon the floor, an intermediate member supported upon said base member for substantially longitudinal forward and rearward movements to and from a plurality of positions of adjustment, an upper carriage member adapted to be secured to the seat and mounted upon said intermediate member for tilting and adjusting movements with respect thereto, a pair of oppositely inclined track sections provided upon said intermediate member, said track sections sloping upwardly toward the respective ends of said member, a pair of rollers on said upper carriage member each adapted to roll upon one of said track sections during said tilting movement, means for retaining said base and intermediate members in adjusted positions, and means associated with a portion of said intermediate member between said track sections for retaining said intermediate and upper members in adjusted positions.

10. An adjustable seat support comprising, in combination, a base member adapted to rest upon the floor, an intermediate member supported upon said base member for substantially longitudinal forward and rearward movements to and from a plurality of positions of adjustment, an upper carriage member adapted to be secured to the seat and mounted upon said intermediate member for tilting and adjusting movements with respect thereto, a substantially arcuate track on said base member whose approximate center of curvature is below said track, rollers on said intermediate member adapted to roll on said track during said forward and rearward adjustment, a track on said intermediate member and a roller on said upper carriage member adapted to roll on said track during said tilting adjustment, and means for retaining the members of said support in their various positions of adjustment.

PEARLE N. MILLER.